US012638734B2

(12) United States Patent
Zhang et al.

(10) Patent No.: US 12,638,734 B2
(45) Date of Patent: May 26, 2026

(54) DISPLAY SUBSTRATE AND DISPLAY DEVICE

(71) Applicants: HEFEI BOE DISPLAY TECHNOLOGY CO., LTD., Hefei (CN); BOE TECHNOLOGY GROUP CO., LTD., Beijing (CN)

(72) Inventors: Chunxu Zhang, Beijing (CN); Maoxiu Zhou, Beijing (CN); Min Cheng, Beijing (CN); Jiantao Liu, Beijing (CN); Xiaoting Jiang, Beijing (CN); Haipeng Yang, Beijing (CN); Ke Dai, Beijing (CN)

(73) Assignees: HEFEI BOE DISPLAY TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 141 days.

(21) Appl. No.: 18/577,847

(22) PCT Filed: Dec. 23, 2022

(86) PCT No.: PCT/CN2022/141557
§ 371 (c)(1),
(2) Date: Jan. 9, 2024

(87) PCT Pub. No.: WO2024/130725
PCT Pub. Date: Jun. 27, 2024

(65) Prior Publication Data
US 2025/0093719 A1 Mar. 20, 2025

(51) Int. Cl.
*G02F 1/1362* (2006.01)
*G02F 1/1368* (2006.01)

(52) U.S. Cl.
CPC .. *G02F 1/136286* (2013.01); *G02F 1/136213* (2013.01); *G02F 1/1368* (2013.01)

(58) Field of Classification Search
CPC ......... G02F 1/136286; G02F 1/136213; G02F 1/1368
See application file for complete search history.

(56) References Cited

U.S. PATENT DOCUMENTS

| | | | |
|---|---|---|---|
| 7,538,842 B2 | 5/2009 | Kim | |
| 2017/0277006 A1 | 9/2017 | Wang | |

(Continued)

FOREIGN PATENT DOCUMENTS

| | | |
|---|---|---|
| CN | 101276810 A | 10/2008 |
| CN | 100592177 C | 2/2010 |

(Continued)

OTHER PUBLICATIONS

Extended European Search Report Europe Application No. 22969012.8; Mailing Date : Dec. 12, 2025.

*Primary Examiner* — David Y Chung
(74) *Attorney, Agent, or Firm* — Dilworth & Barrese, LLP.; Michael J. Musella, Esq.

(57) ABSTRACT

Provided are a display substrate and a display device. The first display region includes at least two domains spaced apart in the first direction and a first space between the at least two domains, the second display region includes at least two domains spaced apart in the first direction and a second space located between the at least two domains of the second display region; each pixel units further includes a discharge line and a common electrode strip, the discharge line includes a first conductive part and a second conductive part, the first conductive part is at the first space, the second conductive part is at the second space, the common electrode strip is at an edge of the first display region adjacent to the data lines, and no common electrode strip is arranged on an edge of the second display region adjacent to the data lines.

18 Claims, 5 Drawing Sheets

(56)          References Cited

U.S. PATENT DOCUMENTS

2020/0411557 A1    12/2020  Xi
2021/0026210 A1*   1/2021  Kim .................. G02F 1/133512
2021/0333663 A1*  10/2021  Lee ................... G02F 1/136222

FOREIGN PATENT DOCUMENTS

| CN | 105676499 A | 6/2016 |
|----|-------------|--------|
| CN | 113485051 A | 10/2021 |
| CN | 113763849 A | 12/2021 |
| JP | 2015196869 A | 11/2015 |

* cited by examiner

100

Display Device 300

Display Substrate 100

FIG. 7

DISPLAY SUBSTRATE AND DISPLAY DEVICE

TECHNICAL FIELD

Embodiments of the present disclosure relate to a display substrate and a display device.

BACKGROUND

With the continuous development of display technology, display devices are increasingly used in various electronic products. At present, display devices mainly include organic light-emitting diode display devices and liquid crystal display devices. An organic light-emitting diode display device usually includes an anode, a cathode, and an organic light-emitting layer arranged between the anode and the cathode; the organic light-emitting diode can generate current through the anode and the cathode to drive the organic light-emitting layer for light-emitting display.

On the other hand, a liquid crystal display device generally includes a display substrate arranged with a thin film transistor array, a counter substrate disposed opposite to the display substrate, and a liquid crystal layer located between the display substrate and the counter substrate. The liquid crystal display device can generate an electric field through the pixel electrode in the display substrate to change the rotation direction of the liquid crystal molecules in the liquid crystal layer, and cooperate with polarizers to achieve display. According to the electric field driving method, liquid crystal display devices can be divided into vertical liquid crystal display devices driven by vertical electric fields (for example, VA mode) and horizontal liquid crystal display devices driven by horizontal electric fields (for example, IPS or ADS mode).

SUMMARY

At least an embodiment of the present disclosure provides a display substrate and a display device. The display substrate comprises a base substrate, a plurality of pixel units and a plurality of data lines; the plurality of pixel units are arranged in an array on the base substrate along a first direction and a second direction; the plurality of data lines are arranged along the first direction, and each of the data lines extends along the second direction; each of the pixel units is located between two of the data lines adjacent to each other, each of the pixel units comprises a gate structure extending along the first direction, a first display region located on a first side of the gate structure, and a second display region located on a second side of the gate structure; the first display region comprises at least two domains spaced apart in the first direction and a first space between the at least two domains and extending along the second direction, the second display region comprises at least two domains spaced apart in the first direction and a second space located between the at least two domains of the second display region and extending along the second direction; and each of the pixel units further comprises a discharge line and a common electrode strip, the discharge line comprises a first conductive part and a second conductive part, the first conductive part extends along the second direction and is located at the first space, the second conductive part extends along the second direction and is located at the second space, the common electrode strip is located at an edge of the first display region adjacent to the data lines, and no common electrode strip is arranged on an edge of the second display region adjacent to the data lines. Therefore, the display substrate is provided with discharge lines at the first space of the first display region and the second space of the second display region, so that the discharge lines can be prevented from affecting the aperture ratio of the pixel unit, and the voltage on the pixel electrode can be finely adjusted through the discharge lines, so that the common electrode strip in the second display region can be omitted, and the aperture ratio of the display substrate can be improved.

At least an embodiment of the present disclosure provides a display substrate, the display substrate comprises a base substrate, a plurality of pixel units arranged in an array on the base substrate along a first direction and a second direction, and a plurality of data lines arranged along the first direction, each of the data lines extends along the second direction, each of the pixel units is located between two of the data lines adjacent to each other, and each of the pixel units comprises a gate structure extending along the first direction, a first display region located on a first side of the gate structure, and a second display region located on a second side of the gate structure; the first display region comprises at least two domains spaced apart in the first direction and a first space between the at least two domains and extending along the second direction, the second display region comprises at least two domains spaced apart in the first direction and a second space located between the at least two domains of the second display region and extending along the second direction; and each of the pixel units further comprises a discharge line and a common electrode strip, the discharge line comprises a first conductive part and a second conductive part, the first conductive part extends along the second direction and is located at the first space, the second conductive part extends along the second direction and is located at the second space, the common electrode strip is located at an edge of the first display region adjacent to the data lines, and no common electrode strip is arranged on an edge of the second display region adjacent to the data lines.

For example, in at least an embodiment of the present disclosure, a size of an effective light-emitting region of the first display region in the first direction is smaller than a size of an effective light-emitting region of the second display region in the first direction.

For example, in at least an embodiment of the present disclosure, the at least two domains of the first display region comprise a first domain, a second domain, a third domain and a fourth domain, the first domain and the second domain are located on two sides of the first space and are opposite to each other, the third domain and the fourth domain are located on two sides of the first space and are opposite to each other; and the at least two domains of the second display region comprise a fifth domain, a sixth domain, a seventh domain and an eighth domain, the fifth domain and the sixth domain are located on two sides of the second space and are opposite to each other, and the seventh domain and the eighth domain are located on two sides of the second space and are opposite to each other.

For example, in at least an embodiment of the present disclosure, each of the pixel units further comprises a first pixel electrode, a second pixel electrode, a first control transistor comprising a gate electrode, a first electrode and a second electrode, and a second control transistor comprising a gate electrode, a first electrode and a second electrode; the gate electrode of the first control transistor and the gate electrode of the second control transistor are respectively connected with the gate structure, the first electrode of the first control transistor and the first electrode of the second control transistor are respectively connected with the data lines, the second electrode of the first control transistor is connected to the first pixel electrode, and the second electrode of the second control transistor is connected with the second pixel electrode.

For example, in at least an embodiment of the present disclosure, each of the pixel units further comprises: a discharge transistor comprising a gate electrode, a first electrode and a second electrode, the gate electrode of the discharge transistor is connected with the gate structure, the first electrode of the discharge transistor is connected with the discharge line, and the second electrode of the discharge transistor is connected with the second pixel electrode.

For example, in at least an embodiment of the present disclosure, each of the pixel units further comprises: a vertical common electrode line, an orthographic projection of the vertical common electrode line on the base substrate is overlapped with both an orthographic projection of the first conductive part on the base substrate and an orthographic projection of the second conductive part on the base substrate.

For example, in at least an embodiment of the present disclosure, the vertical common electrode line and the gate structure are located in a first conductive layer, the discharge line and the data line are located in a second conductive layer, and the second conductive layer is located on a side of the first conductive layer away from the base substrate.

For example, in at least an embodiment of the present disclosure, each of the pixel units further comprises: a first capacitor comprising a first electrode plate and a second electrode plate, the second electrode plate is located on a side of the first electrode plate away from the base substrate, and the second electrode plate is connected with the second electrode of the first control transistor.

For example, in at least an embodiment of the present disclosure, the first display region further comprises: a transverse common electrode line connected with the first electrode plate, the first display region comprises two common electrode strips respectively located at two edges of the first display region close to two of the data lines adjacent to each other, and the two common electrode strips are connected with the transverse common electrode line.

For example, in at least an embodiment of the present disclosure, each of the pixel units further comprises: a second capacitor comprising a third electrode block and a fourth electrode block, the second electrode block is located on a side of the first electrode block away from the base substrate, both the second electrode of the second control transistor and the second electrode of the discharge transistor are connected with the second electrode block, and the vertical common electrode line is connected to the third electrode block.

For example, in at least an embodiment of the present disclosure, a first spacer region and a second spacer region are respectively between the first electrode block and the two of the data lines adjacent to each other, and the first spacer region and the second spacer region are light-transmitting regions.

For example, in at least an embodiment of the present disclosure, the first spacer region and the second spacer region are not provided with common electrode lines.

For example, in at least an embodiment of the present disclosure, the discharge line further comprises a discharge connection part connecting the first conductive part and the second conductive part; and an orthographic projection of the discharge connection part on the base substrate surrounds a part of an orthographic projection of the third electrode block on the base substrate.

For example, in at least an embodiment of the present disclosure, the gate structures of two of the pixel units adjacent to each other in the first direction are connected with each other, and together form a gate line extending along the first direction, there is an overlapping region in which the gate line overlaps with the data line between the two of the pixel units adjacent to each other; in the overlapping region, the gate line comprises a hollow part and a first connecting part and a second connecting part that are located on two sides of the hollow part in the second direction, and an orthographic projection of the hollow part on the base substrate overlaps with an orthographic projection of the data line on the base substrate.

For example, in at least an embodiment of the present disclosure, the hollow part comprises a first edge and a second edge, the first edge and the second edge are respectively located on two sides of the data line in the first direction, and a distance between the first edge and the data line ranges from 3 microns to 10 microns, and a distance between the second edge and the data line ranges from 3 microns to 10 microns.

For example, in at least an embodiment of the present disclosure, the discharge line further comprises a discharge connection part connecting the first conductive part and the second conductive part; and an orthographic projection of the discharge connection part on the base substrate overlaps with an orthographic projection of the gate structure on the base substrate.

For example, in at least an embodiment of the present disclosure, a shape of an orthographic projection of the discharge connection part on the base substrate comprises a hypotenuse, and an angle between an extension direction of the hypotenuse and the first direction or the second direction ranges from 20 degrees to 70 degrees.

For example, in at least an embodiment of the present disclosure, the angle between the extension direction of the hypotenuse and the first direction or the second direction ranges from 40 degrees to 50 degrees.

At least an embodiment of the present disclosure further provides a display device, and the display device comprises any one of the display substrates mentioned above.

BRIEF DESCRIPTION OF DRAWINGS

In order to clearly illustrate the technical solution of the embodiments of the present disclosure, the drawings of the embodiments will be briefly described. It is obvious that the described drawings in the following are only related to some embodiments of the present disclosure and thus are not construed as any limitation to the present disclosure.

FIG. 7 is a schematic diagram of a display device provided by an embodiment of the present disclosure.

DETAILED DESCRIPTION

Figure 1A:
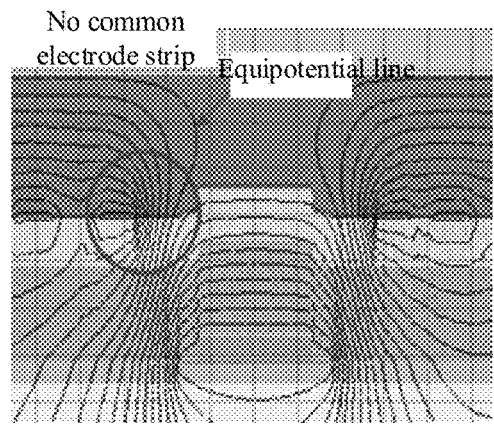
FIGS. 1A to 1B are electric field simulation diagrams of a liquid crystal display device.

In order to make objectives, technical details, and advantages of the embodiments of the present disclosure more clear, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Unless otherwise defined, the features such as "parallel", "vertical", and "identical" used in the embodiment of the present disclosure all include strictly defined situations such as "parallel", "vertical", and "identical", as well as situations where "roughly parallel", "roughly vertical", and "roughly identical" contain certain errors. For example, the above 'roughly" can indicate that the difference between the compared objects is 10% of the average value of the compared objects, or within 5%. In a case that the number of a component or an element is not specifically specified in the following embodiments of the present disclosure, it means that the component or the element can be one or multiple, or can be understood as at least one. "At least one" refers to one or more, and "multiple" refers to at least two.

According to the electric field driving method, liquid crystal display devices can generally be divided into vertical liquid crystal display devices driven by vertical electric fields (that is, VA mode) and horizontal liquid crystal display devices driven by horizontal electric fields (that is, IPS or ADS mode). During the research, the inventors of the present application noticed that liquid crystal display devices of VA mode paired with COA (Color filter On Array) technology not only have greater advantages in contrast than liquid crystal display devices of ADS mode and IPS mode, but also have greater advantages in aperture ratio than the liquid crystal display devices of ADS mode and IPS mode. However, in actual products, due to reasons such as pixel unit domain classification, the aperture ratio of the actual liquid crystal display devices of VA mode are not much higher than the aperture ratio of the liquid crystal display devices of ADS mode and the IPS mode.

On the other hand, in order to increase the aperture ratio, common electrode strips may be arranged on two sides of the data line to absorb the electric field of the data line in a conventional liquid crystal display device of VA mode. Thus, the impact of the data line on the voltage on the pixel electrode is reduced, so that electric field shielding is achieved; at the same time, the common electrode strip and the data line can work together as a light-shielding structure, so that it is realized that there is no need to provide a black matrix on the data line.

Figure 1B:
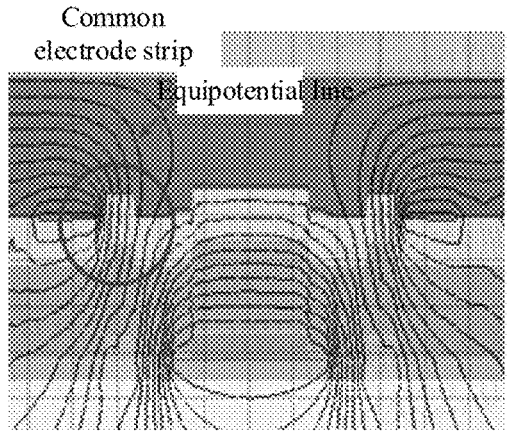

FIGS. 1A to 1B are electric field simulation diagrams of a liquid crystal display device. As shown in FIG. 1, in the case where a common electrode strip is arranged near the data line, voltage equipotential lines near the pixel electrode are much sparse; in other words, the pulling action generated by the data line on the voltage on the pixel electrode is also much smaller. However, the inventors of the present application noticed that the setting of the common electrode strip will reduce the aperture ratio of the pixel unit.

In this regard, in order to further improve the transmittance advantage of the liquid crystal display devices of VA mode and simultaneously increase the product yield, embodiments of the present disclosure provide a display substrate and a display device. The display substrate further includes a base substrate, a plurality of pixel units and a plurality of data lines; the plurality of pixel units are arranged in an array on the base substrate along a first direction and a second direction; the plurality of data lines are arranged along the first direction, and each of the data lines extends along the second direction; each of the pixel units is located between two of the data lines adjacent to each other. Each of the pixel units includes a gate structure extending along the first direction, a first display region located on a first side of the gate structure, and a second display region located on a second side of the gate structure; the first display region includes at least two domains spaced apart in the first direction and a first space located between the at least two domains and extending along the second direction, the second display region includes at least two domains spaced apart in the first direction and a second space located between the at least two domains and extending along the second direction; each of the pixel units further includes a discharge line and a common electrode strip, the discharge line includes a first conductive part and a second conductive part, the first conductive part extends along the second direction and is located at the first space, the second conductive part extends along the second direction and is located at the second space, the common electrode strip is located at the edge of the first display region adjacent to the data lines, and no common electrode strip is provided at the edge of the second display region adjacent to the data lines. In this way, the display substrate is provided with the discharge line at the first space of the first display region and the second space of the second display region, thus the discharge line can be prevented from affecting the aperture ratio of the pixel unit, and the voltage on the pixel electrode can also be finely adjusted through the discharge line, so that the common electrode strip in the second display region can be omitted, thereby improving the aperture ratio of the display substrate.

Next, the display substrate and display device provided by the embodiments of the present disclosure will be described in detail with reference to the accompanying drawings.

Figure 2:
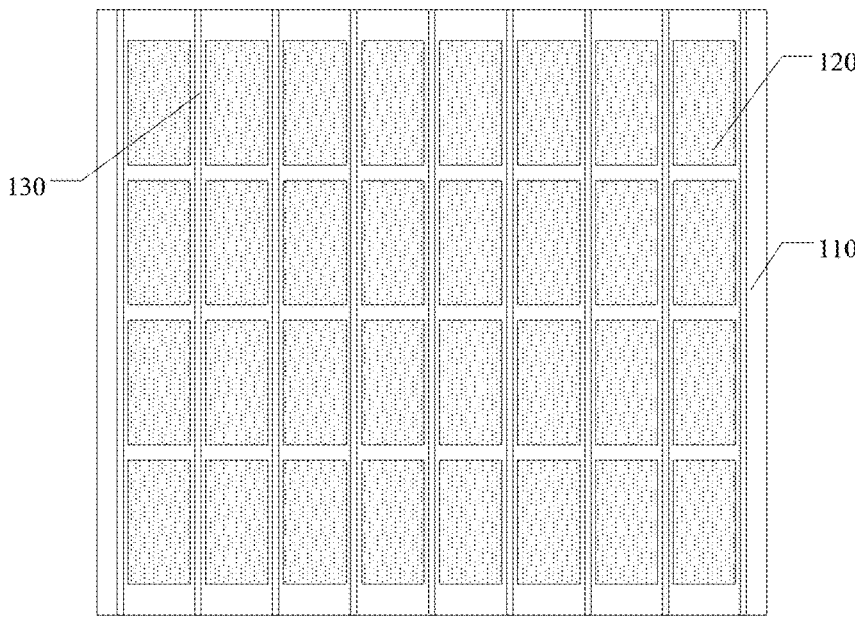
FIG. 2 is a planar schematic diagram of a display substrate provided by an embodiment of the present disclosure.

An embodiment of the present disclosure provides a display substrate. FIG. 2 is a planar schematic diagram of a display substrate provided by an embodiment of the present disclosure; and FIG. 3 is a planar schematic diagram of a pixel unit in a display substrate provided by an embodiment of the present disclosure.

Figure 3:
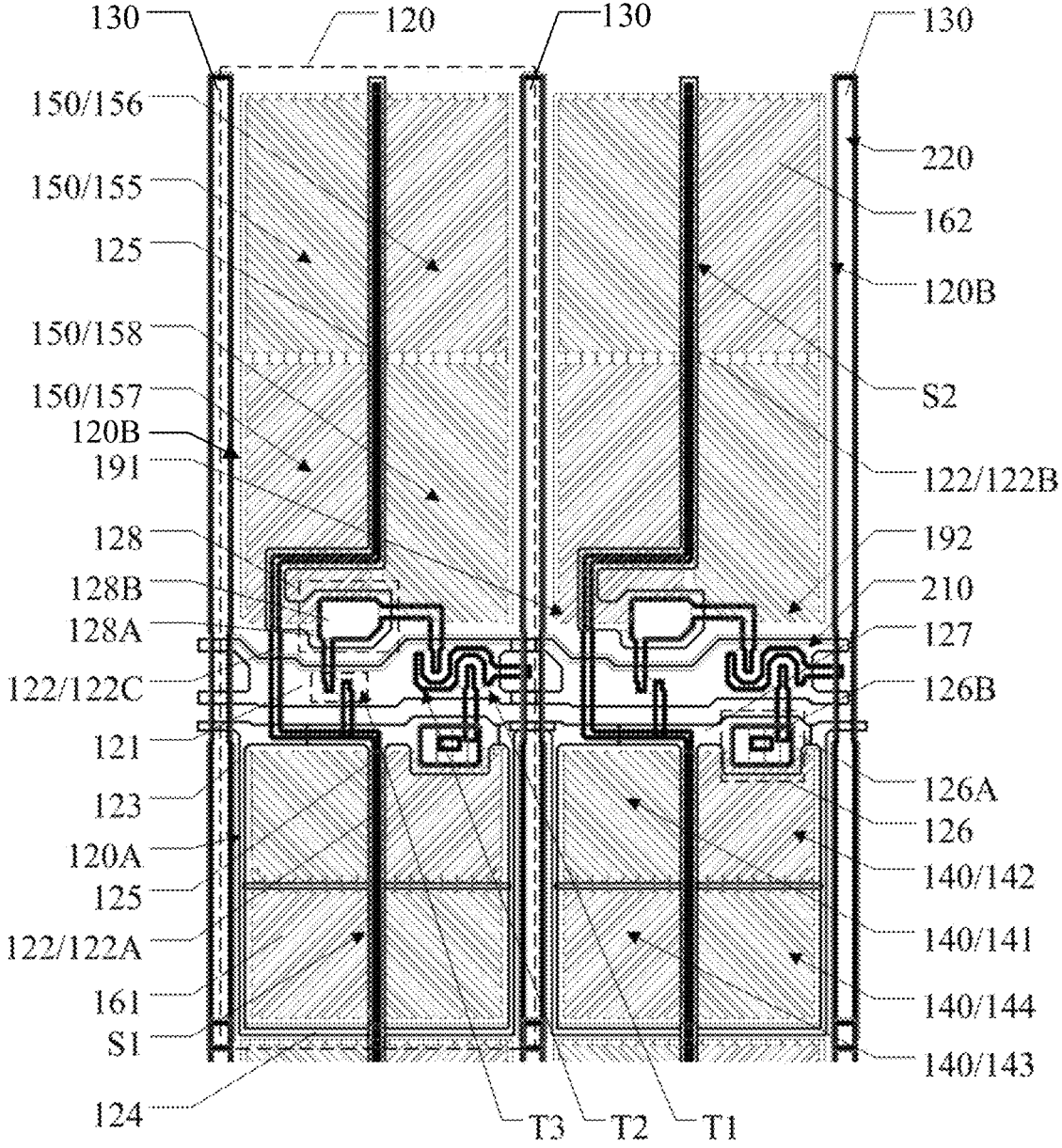
FIG. 3 is a planar schematic diagram of a pixel unit in a display substrate provided by an embodiment of the present disclosure.

As shown in FIGS. 2 and 3, the display substrate 100 further includes a base substrate 110, a plurality of pixel units 120 and a plurality of data lines 130; the plurality of pixel units 120 are arranged in an array on the base substrate 110 along a first direction and a second direction; the plurality of data lines 130 are arranged along the first direction, and each of the data lines 130 extends along the second direction. Each of the pixel units 120 is located between two of the data lines 130 adjacent to each other. Each of the pixel units 120 includes a gate structure 121 extending along the first direction, a first display region 120A located on a first side of the gate structure 121, and a second display region 120B located on a second side of the gate structure 121; the first display region 120A includes at least two domains 140 spaced apart in the first direction and a first space S1 located between the at least two domains 140 and extending along the second direction, the second display region 120B includes at least two domains 150 spaced apart in the first direction and a second space S2 located between the at least two domains 150 and extending along the second direction. On the one hand, a first display region and a second display region in the pixel unit can be provided in the display substrate, the first display region is a bright display region, and the second display region is a dark display region; in this way, in the case that the first display region and the second display region play a role of displaying together as one pixel unit, the aperture ratio of the display substrate can be further increased. On the other hand, the viewing angle of the display substrate can be increased by arranging a plurality of domains in the pixel unit.

As shown in FIGS. 2 and 3, each of the pixel units 120 further includes a discharge line 122 and a common electrode strip 123. The discharge line 122 includes a first conductive part 122A and a second conductive part 122B, the first conductive part 122A extends along the second direction and is located at the first space S1, the second conductive part 122B extends along the second direction and is located at the second space S2, the common electrode strip 123 is located at an edge of the first display region 120A adjacent to the data lines 130, no common electrode strip 123 is arranged on the edge of the second display region 120B adjacent to the data line 130.

In the embodiment of the present disclosure, the display substrate is arranged with the discharge lines at the first space of the first display region and the second space of the second display region, thus the discharge lines can be prevented from affecting the aperture ratio of the plurality of pixel units; on the other hand, since each of the pixel units is provided with the discharge line and the second display region can be used as a dark display region, the display substrate can also finely adjust the voltage on the pixel electrode through the discharge line, to compensate for the pulling action generated by the data lines on the voltage on the pixel electrodes in the second display region, thus the common electrode strip in the second display region can be omitted, so that the aperture ratio of the display substrate can be improved.

In some examples, the base substrate may be a glass substrate, a plastic substrate, or a quartz substrate; and the base substrate can be a rigid substrate or a flexible substrate.

In some examples, a material of the data lines may include a metal material such as molybdenum, aluminum, copper, or silver.

In some examples, the first direction and the second direction mentioned above are different directions; for example, the first direction and the second direction mentioned above may be perpendicular to each other. Of course, embodiments of the present disclosure include but are not limited to this case, and the first direction and the second direction may also intersect each other.

In some examples, a size of the above-mentioned common electrode strip in the first direction ranges from 2 microns to 4 microns. Of course, the embodiments of the present disclosure include but are not limited to this case.

In some examples, as shown in FIGS. 2 and 3, since there is no common electrode strip in the second display region 120B, a size of an effective light-emitting region of the first display region 120A in the first direction is smaller than a size of an effective light-emitting region of the second display region 120B in the first direction. In this way, the aperture ratio of the second display region is greater than the aperture ratio of the first display region.

In some examples, as shown in FIGS. 2 and 3, each of the pixel units 120 further includes a first pixel electrode 161, a second pixel electrode 162, a first control transistor T1 and a second control transistor T2; the first control transistor T1 includes a gate electrode, a first electrode and a second electrode; the second control transistor T2 includes a gate electrode, a first electrode and a second electrode; the gate electrode of the first control transistor T1 and the gate electrode of the second control transistor T2 are respectively connected with the gate structure 121, the first electrode of the first control transistor T1 and the first electrode of the second control transistor T2 are respectively connected with the data line 130. The second electrode of the first control transistor T1 is connected with the first pixel electrode 161, the second electrode of the second control transistor T2 is connected with the second pixel electrode 162. In this way, the first display region and the second display region in each of the pixel units can play a role of displaying together.

In some examples, as shown in FIGS. 2 and 3, each of the pixel units 120 further includes a discharge transistor T3, the discharge transistor T3 includes a gate electrode, a first electrode and a second electrode; the gate electrode of the discharge transistor T3 is connected with the gate structure 121, the first electrode of the discharge transistor T3 is connected with the discharge line 122, and the second electrode of the discharge transistor T3 is connected with the second pixel electrode 162. In this way, the display substrate can discharge the second pixel electrode through the discharge line and the discharge transistor, thus the voltage on the second pixel electrode can be adjusted.

In some examples, as shown in FIGS. 2 and 3, the at least two domains 140 of the first display region 120A include a first domain 141, a second domain 142, a third domain 143 and a fourth domain 144; the first domain 141 and the second domain 142 are located on two sides of the first space and are opposite to each other, the third domain 143 and the fourth domain 144 are located on two sides of the first space and are opposite to each other; the at least two domains 150 of the second display region 120B include the fifth domain 155, the sixth domain 156, the seventh domain 157 and the eighth domain 158, the fifth domain 155 and the sixth domain 156 are located on two sides of the second space and are opposite to each other, and the seventh domain 157 and the eighth domain 158 are located on two sides of the second space and are opposite to each other.

In some examples, as shown in FIGS. 2 and 3, the first display region 120A further includes a horizontal common electrode strip 124 which is located on a side of both the third domain 143 and the fourth domain 144 away from both the first domain 141 and the second domain 142. In this way, in the display substrate, the resistance of the common electrode can be reduced through the horizontal common electrode strip. It should be noted that the above-mentioned horizontal common electrode strip may also be regarded as being located between two of the pixel units adjacent to each other in the second direction.

In some examples, as shown in FIGS. 2 and 3, each of the pixel units 120 further includes a vertical common electrode line 125; an orthographic projection of the vertical common electrode line 125 on the base substrate 110 is overlapped with an orthographic projection of the first conductive part 122A on the base substrate 110 and an orthographic projection of the second conductive part 122B on the base substrate 110. In this way, the display substrate can be provided with vertical common electrode lines in the region and position occupied by the discharge lines, thus the resistance of the common electrode line can be reduced and the uniformity of the voltage on the common electrode line can be improved. Moreover, the above-mentioned vertical common electrode lines will not affect the aperture ratio of the plurality of pixel units. It should be noted that the above-mentioned common electrode strips, horizontal common electrode strips and vertical common electrode lines are all parts of the common electrode lines and are used to transmit common electrode signals.

Figure 4A:
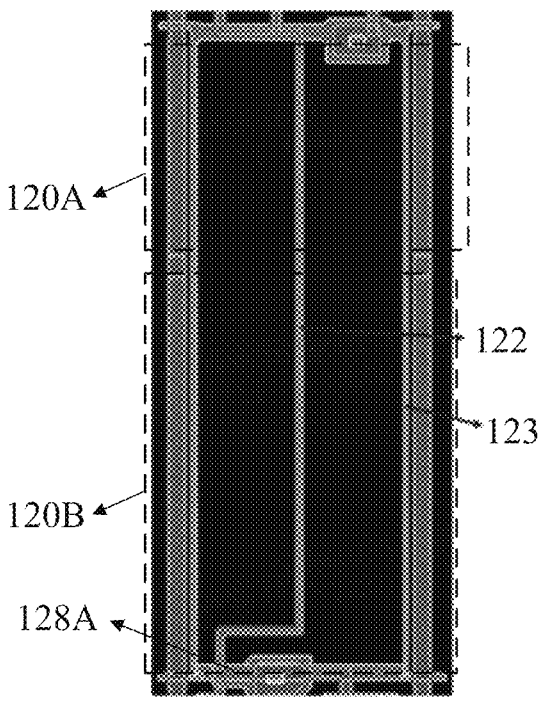
FIG. 4A shows a partially enlarged schematic diagram of a pixel unit in a display substrate.
Figure 4B:
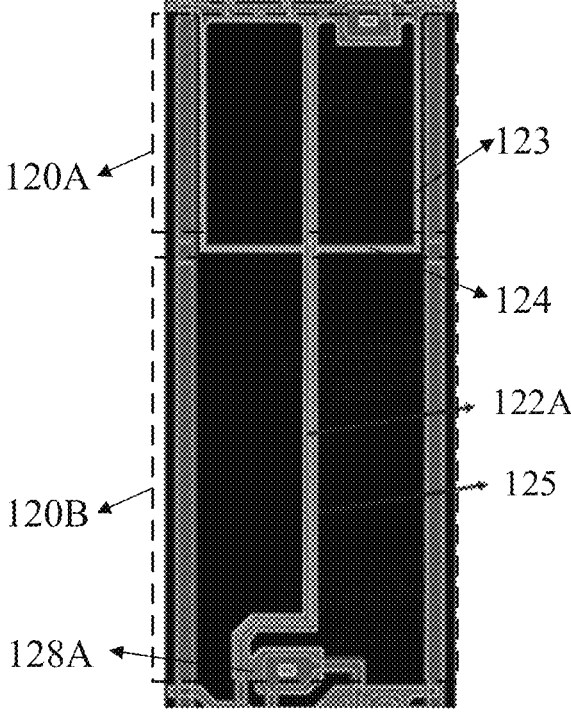
FIG. 4B shows a partially enlarged schematic diagram of a pixel unit in a display substrate provided by an embodiment of the present disclosure.

In order to better show the relationship between the vertical common electrode line and the discharge line, FIG. 4A shows a partially enlarged schematic diagram of a pixel unit in a display substrate; and FIG. 4B shows a partially enlarged schematic diagram of a pixel unit in a display substrate provided by an embodiment of the present disclosure. Both FIG. 4A and FIG. 4B show a first display region of a previous pixel unit and a second display region of a next pixel unit.

As shown in FIG. 4A, the second display region 120B belonging to the next pixel unit is also arranged with a common electrode strip 123; as shown in FIG. 4B, the common electrode line 123 is not provided in the second display region 120B belonging to the next pixel unit. It can be seen that the aperture ratio of the display substrate shown in FIG. 4B is improved.

As shown in FIG. 4A, the discharge line 122 extends along the second direction; as shown in FIG. 4B, an orthographic projection of the vertical common electrode line 125 on the base substrate 110 is overlapped with both an orthographic projection of the first conductive part 122A on the base substrate 110 and an orthographic projection of the second conductive part 122B on the base substrate 110. It can be seen that the display substrate shown in FIG. 4B can be provided with the vertical common electrode lines in the region and position occupied by the discharge lines, thus the resistance of the common electrode line can be reduced and the uniformity of the voltage on the common electrode line can be improved. Moreover, the above-mentioned vertical common electrode lines will not affect the aperture ratio of the plurality of pixel units.

In some examples, as shown in FIGS. 2 and 3, because the orthographic projection of the vertical common electrode line 125 on the base substrate 110 is overlapped with both the orthographic projection of the first conductive part 122A on the base substrate 110 and the orthographic projection of the second conductive part 122B on the base substrate 110, the vertical common electrode 125 may also include a third conductive part corresponding to the first conductive part 122A and a fourth conductive part corresponding to the second conductive part 122B; the third conductive part is located at the first space, and the fourth conductive part is located at the second space.

In some examples, a size of the vertical common electrode line 125 in the first direction ranges from 5 microns to 9 microns. Of course, embodiments of the present disclosure include but are not limited to this case.

In some examples, as shown in FIGS. 2 and 3, the vertical common electrode line 125 and the gate structure 121 are located in a first conductive layer 210, the discharge line 122 and the data line 130 are located in a second conductive layer 220, and the second conductive layer is located on a side of the first conductive layer 210 away from the base substrate 110; that is, at least a part of the discharge line 122 is located on a side of the vertical common electrode line 125 away from the base substrate 110.

For example, the above-mentioned first conductive layer 210 may be a gate layer, and the second conductive layer 220 may be a source-drain metal layer.

In some examples, as shown in FIGS. 2 and 3, each of the pixel units 120 further includes a first capacitor 126 which includes a first electrode plate 126A and a second electrode plate 126B; the second electrode plate 126B is located on a side of the first electrode plate 126A away from the base substrate 110, and the second electrode plate 126B is connected with the second electrode of the first control transistor T1. In this way, in the first display region, the driving signal can be stored by using the first capacitor.

In some examples, as shown in FIGS. 2 and 3, the first display region 120A further includes a horizontal common electrode line 127 connected with the first electrode plate 126A; the first display region 120A includes two common electrode strips 123 which are respectively located at two edges of the first display region 120A close to two of the data lines 130 adjacent to each other, the two common electrode strips 123 are connected with the horizontal common electrode line 127. On the one hand, the horizontal common electrode line can apply a common electrode signal on the first electrode block, on the other hand, the common electrode line can also use the first electrode block to reduce the resistance of the common electrode line. It should be noted that the above-mentioned common electrode strips, horizontal common electrode strips, vertical common electrode line and horizontal common electrode line are all parts of the common electrode lines and are used to transmit common electrode signals.

In some examples, as shown in FIGS. 2 and 3, the vertical common electrodes 125 are connected with the lateral common electrodes 127 at the position where the end of the first space S1 is located.

In some examples, as shown in FIGS. 2 and 3, the discharge line 122 further includes a discharge connection part 122C connecting the first conductive part 122A and the second conductive part 122B; an orthographic projection of the discharge connection part 122C on the base substrate 110 surrounds a part of the orthographic projection of the first electrode block 126A on the base substrate 110.

In some examples, as shown in FIGS. 2 and 3, the orthographic projection of the discharge connection part 122C on the base substrate 110 overlaps with an orthographic projection of the gate structure 121 on the base substrate 110.

In some examples, each of the pixel units 120 further includes a second capacitor 128, the second capacitor 128 includes a third electrode block 128A and a fourth electrode block 128B, the fourth electrode block 128B is located on a side of the third electrode block 128A away from the base substrate 110; the second electrode of the second control transistor T2 and the second electrode of the discharge transistor T3 are connected with the fourth electrode block 128B, the vertical common electrode line 125 is connected with the third electrode block 128A, thus the common electrode signal can be provided for the third electrode block 128A.

In some examples, as shown in FIGS. 2 and 3, the vertical common electrode line 125 and the third electrode block 128A are both located in the first conductive layer 210, and may be formed of the same conductive material through the same one patterning process.

In some examples, as shown in FIGS. 2 and 3, the fourth electrode block 128B and the discharge line 122 may be located in the second conductive layer 220, and may be formed of the same conductive material through the same one patterning process.

In some examples, as shown in FIGS. 2 and 3, a first spacer region 191 and a second spacer region 192 are respectively between the third electrode blocks 128A and the two of the data lines 130 adjacent to each other. The first spacer regions 191 and the second spacer regions 192 are light-transmitting regions. In a conventional design, similar to the first electrode block, common electrode structures extending along the first direction are formed on the left and right sides of the third electrode blocks, on the one hand, the third electrode block can be connected to common electrode signal, and on the other hand, the third electrode blocks can also be used to reduce the resistance of the common electrode line; however, such a design will reduce the aperture ratio. Therefore, in the display substrate provided by the embodiment of the present disclosure, the first spacer region and the second spacer region are used as light-transmitting regions to increase the aperture ratio.

In some examples, as shown in FIGS. 2 and 3, the first spacer regions 191 and the second spacer regions 192 are not provided with a common electrode line.

As shown in FIG. 4A, in order to provide the common electrode signal to the third electrode blocks 128A, a common electrode structure extending along the first direction will be formed on the left and right sides of the third electrode blocks 128A respectively; as shown in FIG. 4B, because the third electrode block 128A is connected with the vertical common electrode line 125, the vertical common electrode line 125 may provide the common electrode signal to the third electrode block 128A, thus the common electrode structure on the left and right sides of the third electrode blocks 128A can be omitted, furthermore, the aperture ratio can be improved.

Figure 5:
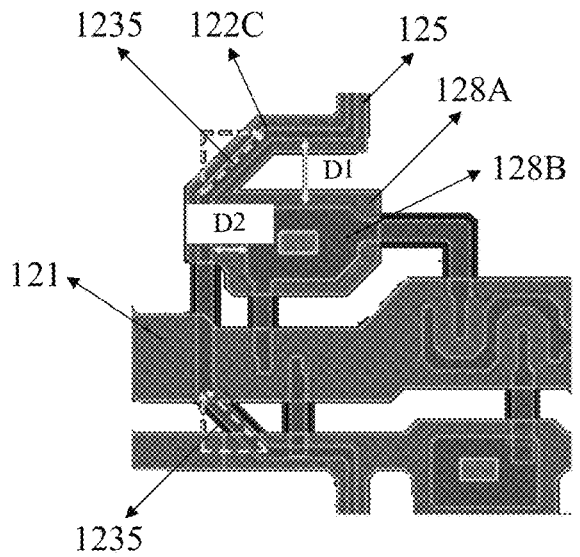
FIG. 5 is a planar schematic diagram of another pixel unit in a display substrate provided by an embodiment of the present disclosure.

FIG. 5 is a planar schematic diagram of another pixel unit in a display substrate provided by an embodiment of the present disclosure. What is different from the pixel unit shown in FIG. 3 is that the shape of the orthographic projection of the discharge connection part 122C of the discharge line 122 on the base substrate 110 includes a hypotenuse 1235. An angle between an extension direction of the hypotenuse 1235 and the first direction or the second direction ranges from 20 degrees to 70 degrees. In this way, the discharge connection part can be routed in an oblique direction in its winding path, thus a length of the discharge connection part can be reduced, and the resistance of the discharge connection part can be reduced.

In some examples, as shown in FIG. 5, the angle between the extension direction of the hypotenuse 1235 and the first direction or the second direction ranges from 40 degrees to 50 degrees.

In some examples, as shown in FIG. 5, a distance between the orthographic projection of the discharge connection part 122C on base substrate 110 and the orthographic projection of the fourth electrode block 128B on the base substrate 110 ranges from 3 microns to 12 microns, thus exposure and etching are ensured to separate the discharge connection part and the fourth electrode block.

In some examples, as shown in FIG. 5, a distance D1 between an orthographic projection of the discharge connection part 122C on the base substrate 110 and an upper edge of an orthographic projection of the fourth electrode block 128B on the base substrate 110 and the distance D2 between the orthographic projection of the discharge connection part 122C on the base substrate 110 and the left edge of the orthographic projection of the fourth electrode block 128B on the base substrate 110 are both in a value range of 3 microns to 12 microns, thus it can be ensured to separate the discharge connection part and the fourth electrode block by the exposure and etching processes.

Figure 6:
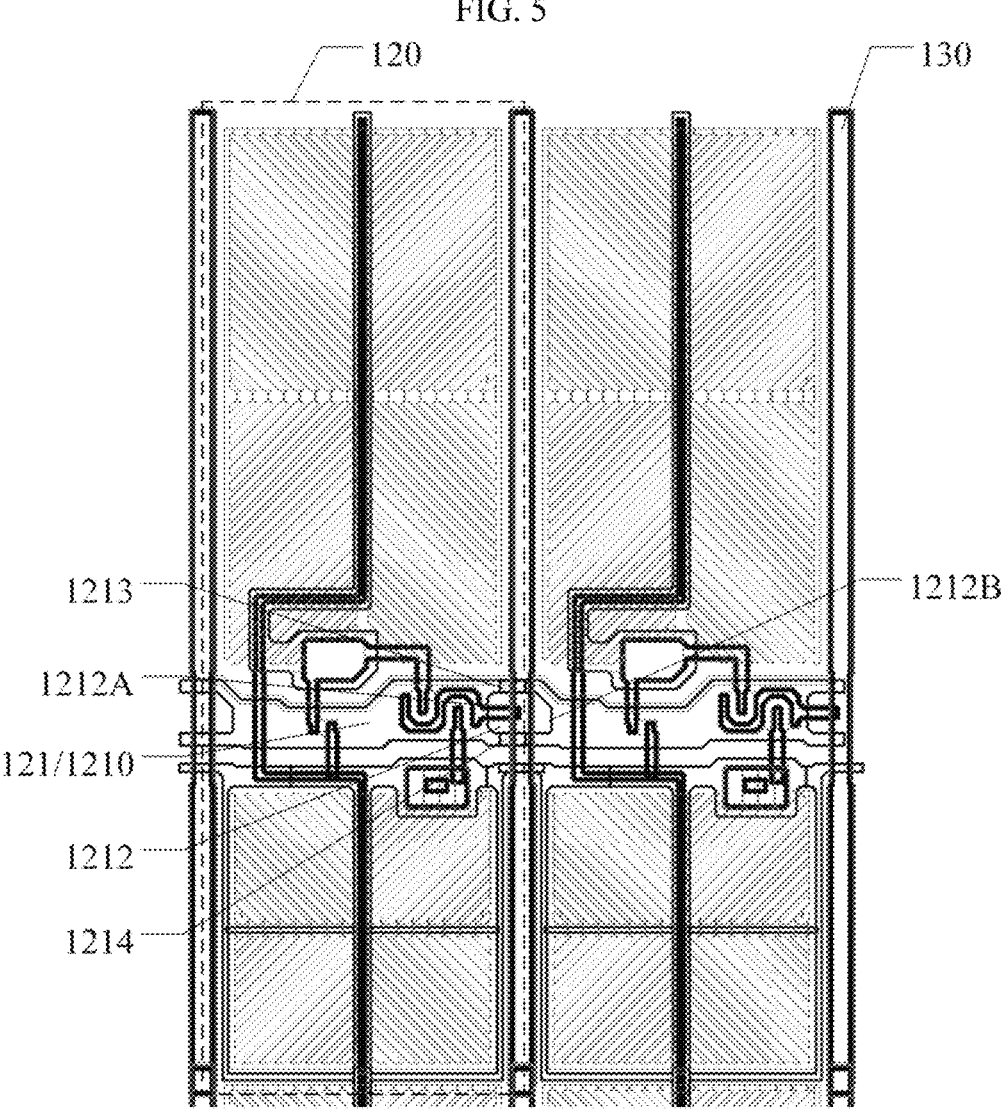
FIG. 6 is a planar schematic diagram of still another pixel unit in a display substrate provided by an embodiment of the present disclosure.

FIG. 6 is a planar schematic diagram of still another pixel unit in a display substrate provided by an embodiment of the present disclosure. As shown in FIG. 6, the gate structures 121 of the two of the pixel units 120 adjacent to each other in the first direction are connected and together form a gate line 1210 extending along the first direction, and an overlapping region is existed between the gate line 1210 and the data line 130 which is between two adjacent pixel units 120. In the overlapping region, the gate line 1210 includes a hollow part 1212 and a first connecting part 1213 and a second connecting part 1214 that are respectively located on two sides of the hollow part 1212 in the second direction, an orthographic projection of the hollow part 1212 on the base substrate 110 overlaps with an orthographic projection of the data line 130 on the base substrate 110. In this way, the gate line 1210 bifurcates into two connection parts in a region where the gate line 1210 overlaps with the data line 130; in this case, in the case that one of the two connection parts is disconnected, the other one can continue to transmit the gate signal, thus the product yield of the display substrate can be improved. On the other hand, in the case that one of the two connection parts is short-circuited, for example, is short-circuited with the data line, two ends of the connection part can be cut off, in this case, the other connection part can still transmit gate signals, thus convenient maintenance can be achieved.

It should be noted that, in the overlapping region of the gate lines and the data lines, in order to reduce the overlapping capacitance, the gate lines will be designed to be thinner, for example, the line width of the gate line is only in a range of 5 microns to 15 microns; in this case, the gate lines are prone to breakage and other defects in the overlapping region. In addition, in the overlapping region, the gate lines and the data lines are also prone to short circuits. In a common design, the gate line is only a single line in the overlapping region, in the case that the above-mentioned defects such as disconnection or short-circuit occurs, one or several pixel units can only be repaired as dark spots by cutting or welding. However, in the display substrate provided by the embodiment of the present disclosure, the gate line is bifurcated into two connecting parts by providing the hollow part in the overlapping region, thus on the one hand, the product yield can be improved, and on the other hand, the pixel unit can be repaired, so that it can display normally, and thus product quality can be improved.

In some examples, as shown in FIG. 6, the hollow part 1212 includes a first edge 1212A and a second edge 1212B, the first edge 1212A and the second edge 1212B are respectively located on two sides of the data line 130 in the first direction; the distance between the first edge 1212A and the data line 130 ranges from 3 microns to 10 microns, and the distance between the second edge 1212B and the data line 130 ranges from 3 microns to 10 microns. In this way, the distance beyond the data line by each of the first connection part and the second connection part is also in a range of 3 microns to 10 microns respectively, thus cutting, such as laser cutting, can be performed easily.

Figure 7:
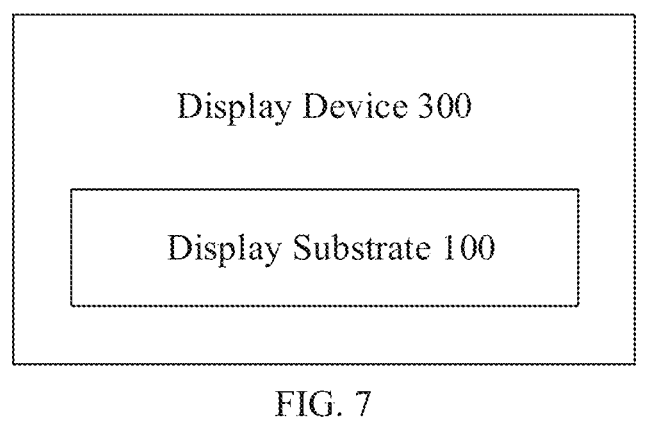

At least one embodiment of the present disclosure further provides a display device. FIG. 7 is a schematic diagram of a display device provided by an embodiment of the present disclosure. As shown in FIG. 7, the display device 300 includes any one of the display substrates 100 mentioned above. In this way, the display device has technical effects corresponding to the beneficial technical effects of the display substrate it includes.

For example, the display device may be a television, a monitor, an electronic picture frame, an electronic photo frame, a navigator, a notebook computer, a tablet computer, a smartphone, or other electronic products with display functions.

For the present disclosure, the following statements should be noted:

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiments can be combined with each other to obtain new embodiments.

The above are only specific embodiments of the present disclosure, but the protection scope of the present disclosure is not limited thereto. Any change or substitution that can be easily thought of by any person skilled in the art within the technical scope disclosed in the present disclosure should be covered within the protection scope of the present disclosure. Therefore, the protection scope of the present disclosure should be subject to the protection scope of the claims.

The invention claimed is:

1. A display substrate, comprising:

a base substrate;

a plurality of pixel units, arranged in an array on the base substrate along a first direction and a second direction; and a plurality of data lines, arranged along the first direction, and each of the data lines extends along the second direction, wherein each of the pixel units is located between two of the data lines adjacent to each other, each of the pixel units comprises a gate structure extending along the first direction, a first display region located on a first side of the gate structure, and a second display region located on a second side of the gate structure;

the first display region comprises at least two domains spaced apart in the first direction and a first space between the at least two domains and extending along the second direction, the second display region comprises at least two domains spaced apart in the first direction and a second space located between the at least two domains of the second display region and extending along the second direction; and each of the pixel units further comprises a discharge line and a common electrode strip, the discharge line comprises a first conductive part and a second conductive part, the first conductive part extends along the second direction and is located at the first space, the second conductive part extends along the second direction and is located at the second space, the common electrode strip is located at an edge of the first display region adjacent to the data lines, and no common electrode strip is arranged on an edge of the second display region adjacent to the data lines;

each of the pixel units further comprises:

a vertical common electrode line, wherein an orthographic projection of the vertical common electrode line on the base substrate is overlapped with both an orthographic projection of the first conductive part on the base substrate and an orthographic projection of the second conductive part on the base substrate.

2. The display substrate according to claim 1, wherein a size of an effective light-emitting region of the first display region in the first direction is smaller than a size of an effective light-emitting region of the second display region in the first direction.

3. The display substrate according to claim 1, wherein the at least two domains of the first display region comprise a first domain, a second domain, a third domain and a fourth domain, the first domain and the second domain are located on two sides of the first space and are opposite to each other, the third domain and the fourth domain are located on two sides of the first space and are opposite to each other; and the at least two domains of the second display region comprise a fifth domain, a sixth domain, a seventh domain and an eighth domain, the fifth domain and the sixth domain are located on two sides of the second space and are opposite to each other, and the seventh domain and the eighth domain are located on two sides of the second space and are opposite to each other.

4. The display substrate according to claim 1, wherein each of the pixel units further comprises:

a first pixel electrode;

a second pixel electrode;

a first control transistor, comprising a gate electrode, a first electrode and a second electrode; and a second control transistor, comprising a gate electrode, a first electrode and a second electrode, wherein the gate electrode of the first control transistor and the gate electrode of the second control transistor are respectively connected with the gate structure, the first electrode of the first control transistor and the first electrode of the second control transistor are respectively connected with the data lines, the second electrode of the first control transistor is connected to the first pixel electrode, and the second electrode of the second control transistor is connected with the second pixel electrode.

5. The display substrate according to claim 4, wherein each of the pixel units further comprises:

a discharge transistor, comprising a gate electrode, a first electrode and a second electrode, wherein the gate electrode of the discharge transistor is connected with the gate structure, the first electrode of the discharge transistor is connected with the discharge line, and the second electrode of the discharge transistor is connected with the second pixel electrode.

6. The display substrate according to claim 1, wherein the vertical common electrode line and the gate structure are located in a first conductive layer, the discharge line and the data line are located in a second conductive layer, and the second conductive layer is located on a side of the first conductive layer away from the base substrate.

7. The display substrate according to claim 1, wherein each of the pixel units further comprises:

a first capacitor, comprising a first electrode plate and a second electrode plate, wherein the second electrode plate is located on a side of the first electrode plate away from the base substrate, and the second electrode plate is connected with the second electrode of the first control transistor.

8. The display substrate according to claim 7, wherein the first display region further comprises:

a transverse common electrode line, connected with the first electrode plate, wherein the first display region comprises two common electrode strips respectively located at two edges of the first display region close to two of the data lines adjacent to each other, and the two common electrode strips are connected with the transverse common electrode line.

9. The display substrate according to claim 1, wherein each of the pixel units further comprises:

a second capacitor, comprising a third electrode block and a fourth electrode block, wherein the second electrode block is located on a side of the first electrode block away from the base substrate, both the second electrode of the second control transistor and the second electrode of the discharge transistor are connected with the second electrode block, and the vertical common electrode line is connected to the third electrode block.

10. The display substrate according to claim 9, wherein a first spacer region and a second spacer region are respectively between the first electrode block and the two of the data lines adjacent to each other, and the first spacer region and the second spacer region are light-transmitting regions.

11. The display substrate according to claim 10, wherein the first spacer region and the second spacer region are not provided with common electrode lines.

12. The display substrate according to claim 9, wherein the discharge line further comprises a discharge connection part connecting the first conductive part and the second conductive part; and an orthographic projection of the discharge connection part on the base substrate surrounds a part of an orthographic projection of the third electrode block on the base substrate.

13. The display substrate according to claim 1, wherein the gate structures of two of the pixel units adjacent to each other in the first direction are connected with each other, and together form a gate line extending along the first direction, there is an overlapping region in which the gate line overlaps with the data line between the two of the pixel units adjacent to each other;

in the overlapping region, the gate line comprises a hollow part and a first connecting part and a second connecting part that are located on two sides of the hollow part in the second direction, and an orthographic projection of the hollow part on the base substrate overlaps with an orthographic projection of the data line on the base substrate.

14. The display substrate according to claim 13, wherein the hollow part comprises a first edge and a second edge, the first edge and the second edge are respectively located on two sides of the data line in the first direction, and a distance between the first edge and the data line ranges from 3 microns to 10 microns, and a distance between the second edge and the data line ranges from 3 microns to 10 microns.

15. The display substrate according to claim 1, wherein the discharge line further comprises a discharge connection part connecting the first conductive part and the second conductive part; and an orthographic projection of the discharge connection part on the base substrate overlaps with an orthographic projection of the gate structure on the base substrate.

16. The display substrate according to claim 15, wherein a shape of an orthographic projection of the discharge connection part on the base substrate comprises a hypotenuse, and an angle between an extension direction of the hypotenuse and the first direction or the second direction ranges from 20 degrees to 70 degrees.

17. The display substrate according to claim 16, wherein the angle between the extension direction of the hypotenuse and the first direction or the second direction ranges from 40 degrees to 50 degrees.

18. A display device, comprising the display substrate according to claim 1.

* * * * *